Sept. 4, 1928.                R. WEBER                  1,683,112
GAS SUPPLYING APPARATUS
Filed May 12, 1924
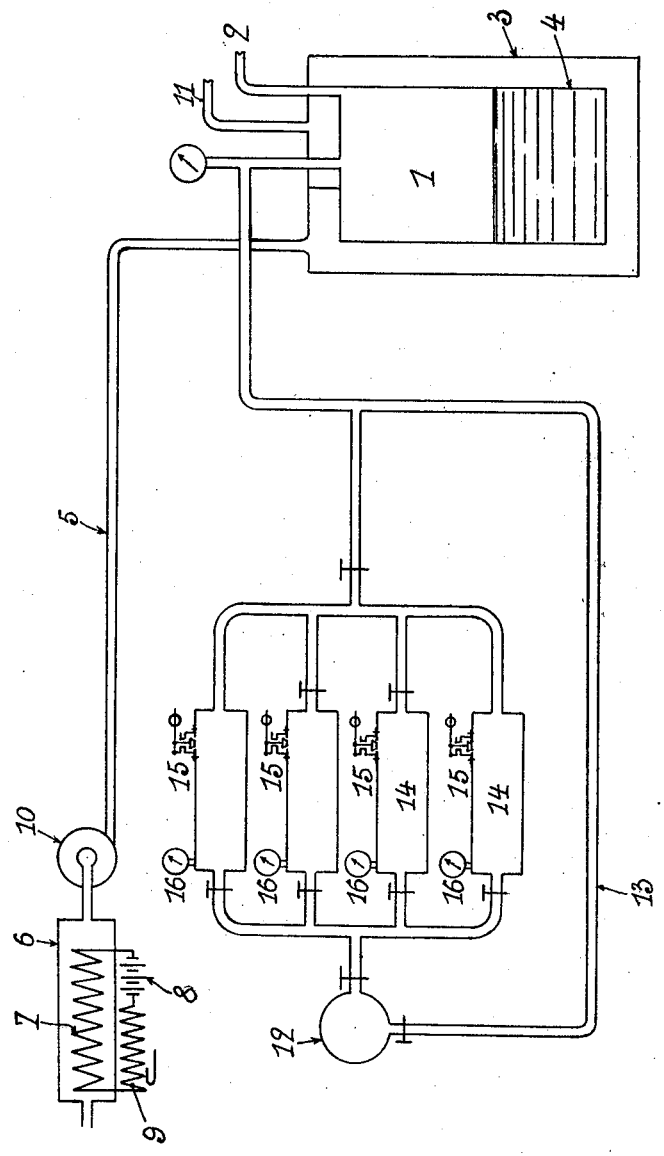
INVENTOR.
Robert Weber
BY: Francis E. Boyer
ATTORNEY Patented Sept. 4, 1928.

1,683,112

UNITED STATES PATENT OFFICE.

ROBERT WEBER, OF HAYANGE, MOSELLE, FRANCE, ASSIGNOR TO LES PETITS FILS DE FRANÇOIS DE WENDEL & CIE., OF PARIS, FRANCE.

GAS-SUPPLYING APPARATUS.

Application filed May 12, 1924, Serial No. 712,827, and in France May 22, 1923.

The invention relates to a plant for supplying a gas to an apparatus using the same, and more particularly to a plant for supplying oxygen in the gaseous state, to autogenous welding outfits or metal cutting outfits.

One object of the invention consists in bringing the gas at the vicinity of the autogenous or welding outfit in the liquefied state and in evaporating the liquid there, thus dispensing with the transport or handling of the usual heavy bottles or steel tubes where the gas is contained in the gaseous state, at pressures which usually reach 150 atmospheres.

Another object of the invention consists in causing the evaporation by accurately controllable means, thus providing for an adjustable output of gas.

A still further object of the invention consists in providing means for controlling the gas pressure, and for storing up the gas in several vessels at different pressures.

The accompanying drawing is a diagrammatic vertical sectional view showing a gas supply plant according to the invention.

The liquid oxygen is supplied to a double-wall receptacle 1 by a pipe 2.

The evaporation of the liquefied oxygen contained in receptacle 1 is produced by circulating a gas between the walls 3 and 4 of the receptacle 1, said gas proceeding through a pipe 5 from a heating chamber 6 containing a heating resistance 7 in the circuit of an electrical source 8 whose current is controlled by a rheostat 9. The current of air produced by a fan 10, or the like, entering chamber 6 and flowing upon said resistance is suitably heated and passes through the walls 3 and 4 of receptacle 1, whence it is discharged by a pipe 11. The control rheostat 9 is preferably placed adjacent the working outfit 12 using the evaporated gas whereby the evaporation may be regulated at will by the operator standing near the working outfit.

Receptacle 1 is connected to the apparatus 12 using gaseous oxygen through the pipe 13. Storage vessels or tubes 14 may be connected to tube 13 and to apparatus 12, as shown.

In operation, the evaporation of the liquefied gas will be regulated by the current of hot gas circulating between the walls of receptacle 1 in such manner that the pressure of the evaporated gas will be equal to or slightly higher than the pressure which is to be maintained in the apparatus 12, i. e. generally about 6 atmospheres.

If it is desired to store up the evaporated gas in separate vessels at different pressures, the storage vessels or tubes 14 will be provided with loaded valves 15 of any known construction adapted to provide for different pressures in the several vessels 14, the gas being discharged through the valves 15 as soon as the pressure exceeds the limit for which the corresponding valve is adjusted.

One or more pressure gauges 16 may be provided for indicating the pressure in the various parts of the plant.

Having now described my invention, what I claim as new and desire to secure by Letters Patent is:

1. A plant for supplying a gas to an apparatus using the same comprising a double wall receptacle adapted to contain the liquefied gas, a heating device embodying an electrical source, an electric resistance and a control rheostat electrically connected together, means for circulating an auxiliary gas between the walls of said receptacle and through said heating device and pipe lines connecting said receptacle to said apparatus.

2. In a plant according to claim 1, the further feature residing in the provision of gas storage vessels on said pipe lines and loaded valves respectively mounted on said storage vessels for controlling the gas pressure therein.

In testimony whereof I have signed my name to this specification.

ROBERT WEBER.